United States Patent [19]
Antos

[11] 3,929,683
[45] Dec. 30, 1975

[54] METHOD OF MANUFACTURING A PLATINUM-TIN REFORMING CATALYST

[75] Inventor: George J. Antos, Arlington Heights, Ill.

[73] Assignee: Universal Oil Products Company, Des Plaines, Ill.

[22] Filed: Nov. 7, 1974

[21] Appl. No.: 521,979

[52] U.S. Cl. .......................... 252/466 PT; 208/138
[51] Int. Cl.² .................... B01J 21/04; B01J 23/62
[58] Field of Search ...................... 252/448, 466 PT

[56] References Cited
UNITED STATES PATENTS
3,740,328  6/1973  Rausch.......................... 252/466 PT Primary Examiner—W. J. Shine
Attorney, Agent, or Firm—James R. Hoatson, Jr.; Robert W. Welch; William H. Page, II

[57] ABSTRACT

A method of catalyst manufacture. A tin-containing alumina support is impregnated with a platinum group metal, and the composite is further treated in contact with a polyalkyl aluminum compound to yield an improved reforming catalyst.

13 Claims, No Drawings

3,929,683

METHOD OF MANUFACTURING A PLATINUM-TIN REFORMING CATALYST

The reforming of gasoline boiling range feed stocks to improve the octane rating thereof is a process well known to the petroleum industry. The feed stock may be a full boiling range gasoline fraction boiling in the 10°–215° C. range although it is more often what is commonly called naphtha — a gasoline fraction characterized by an initial boiling point of from about 65° to about 120° C. and an end boiling point of from about 175° to about 215° C.

The reforming of gasoline boiling range feed stocks is generally recognized as involving a number of octane-improving hydrocarbon conversion reactions requiring a multi-functional catalyst. In particular, the catalyst is designed to effect several octane-improving reactions with respect to paraffins and naphthenes — the feed stock components that offer the greatest potential for octane improvement. Thus, the catalyst is designed to effect isomerization, dehydrogenation, dehydrocyclization, and hydrocracking of paraffins. Of these hydrocarbon conversion reactions, dehydrocyclization produces the greatest gain in octane value and is therefore a favored reaction. For naphthenes, the principal octane-improving reactions involve dehydrogenation and ring isomerization to yield aromatics of improved octane value. With most naphthenes being in the 65–80F-1 clear octane range, the octane improvement, while substantial, is not as dramatic as in the case of the lower octane paraffins. Reforming operations thus employ a multi-functional catalyst designed to provide the most favorable balance between the aforementioned octane-improving reactions to yield a product of optimum octane value, said catalyst having at least one metallic dehydrogenation component and an acid-acting hydrocracking component.

However, even with the achievement of a desired balance between the octane-improving reactions, problems persist relating principally to undesirable side reactions which, although minimal, cumulatively contribute to carbon formation, catalyst instability and product loss. Thus, demethylation occurs with the formation of excess methane; excessive hydrocracking produces light gases; cleavage or ring opening of naphthenes results in the formation of low octane, straight chain hydrocarbons; condensation of aromatics forms coke precursors and carbonaceous deposits; and the acid catalyzed polymerization of olefins and other polymerizable materials yields high molecular weight hydrocarbons subject to dehydrogenation and further formation of carbonaceous matter.

Accordingly, an effective reforming operation is dependent on the proper selection of catalyst and process variables to minimize the effect of undesirable side reactions for a particular hydrocarbon feed stock. However, the selection is complicated by the fact that there is an interrelation between reaction conditions relating to undesirable side reactions and desirable octane-improving reactions, and reaction conditions selected to optimize a particular octane-improving reaction may, and often do, also promote one or more undesirable side reactions. For example, as previously indicated, some hydrocracking is desirable since it produces lower boiling hydrocarbons of higher octane value than the parent hydrocarbons. But hydrocracking of the lower boiling $C_6$–$C_8$ constituents is not desirable since it produces still lower boiling hydrocarbons, such as butane, which are of marginal utility. It is this type of hydrocracking that is referred to as excessive hydrocracking and to be avoided. The extent and kind of hydrocracking is controlled by careful regulation of the acid-acting component of the catalyst and by the use of low hydrogen partial pressures. The latter follows from the fact that the hydrocracking reaction consumes hydrogen and the reaction can therefore be controlled by limiting hydrogen concentration in the reaction media. Low hydrogen partial pressures have a further advantage in that the main octane-improving reactions, i.e., dehydrogenation of paraffins and naphthenes, are net producers of hydrogen and, as such, favored by low hydrogen pressures.

Catalysts comprising a supported platinum group metal, for example, platinum supported on alumina, are widely known for their selectivity in the production of high octane aromatics, general activity with respect to each of the several octane-improving reactions which make up the reforming operation, and for their stability at reforming conditions. One of the principal objections to low pressure reforming relates to its effect on catalyst stability. This stems from the fact that low pressure operation tends to favor the aforementioned condensation and polymerization reactions believed to be the principal reactions involved in the formation of coke precursors and carbon deposits so detrimental to catalyst stability.

It is an object of this invention to present an improved reforming catalyst particularly suitable for low pressure reforming and characterized by a novel method of manufacture. As will become apparent with reference to the following detailed specification, the catalyst composite of this invention comprises a platinum group metal component impregnated on a tin-containing refractory inorganic oxide support or carrier material.

In one of its broad aspects, the present invention embodies a method of catalyst manufacture which comprises solubilizing a tin compound in an acidic hydrosol precursor of an inorganic oxide gel; effecting gelation of the tin-containing hydrosol; drying and calcining the tin-containing gelation product; impregnating the calcined product with an aqueous solution of a thermally decomposable platinum group metal compound; drying the impregnated material and heating the same at conditions to remove adsorbed oxygen; commingling the resulting composite with a solution of a polyalkyl aluminum compound; drying and treating the dried composite in a hydrogen atmosphere at a temperature of from about 425° to about 650° C.

One of the more specific embodiments of the present invention is in a method of catalyst manufacture which comprises solubilizing stannic chloride in an aluminum hydroxychloride hydrosol comprising aluminum in from about a 1:1 to about a 1.5:1 ratio with the chloride anion content thereof; commingling hexamethylenetetramine with the tin-containing hydrosol and dispersing the mixture as droplets in a hot oil bath whereby gelation occurs with the formation of spheroidal gel particles; drying and calcining the tin-containing gelation product in air at a temperature of from about 425° to about 815° C.; impregnating the calcined product with an aqueous chloroplatinic acid solution; drying and calcining the impregnated material in air, and heating the same in a nitrogen atmosphere at a temperature of from about 95° to about 600° C.; commingling the resulting composite with a heptane solution of triethyl aluminum; drying, and treating the dried composite in a hydrogen atmosphere at a temperature of from about 425° to about 650° C.

Other objects and embodiments of this invention will become apparent in the following detailed specification.

In accordance with the method of this invention, a tin compound is initially solubilized in an acidic hydrosol precursor of an inorganic oxide gel. The acidic hydrosols herein contemplated are such as are prepared by the hydrolysis of an acid salt of an appropriate metal at conditions to induce olation of the hydrolysis product and formation of inorganic polymers of colloidal dimension dispersed and suspended in the remaining liquid. For example, refractory inorganic oxides typically employed as a catalyst support or carrier material include alumina, silica, zirconia, titania, chromia, and the like, and an acid salt of an apropriate metal would therefore be such as the chlorides, sulfates, nitrates, acetates, etc., of aluminum, silicon, zirconium, titanium, chromium, and the like. More specifically, alumina is a preferred refractory inorganic oxide for use herein, and an acidic alumina hydrosol precursor thereof is such as is prepared by the general method whereby a suitable acid salt of aluminum, such as aluminum chloride, is subjected to hydrolysis in aqueous solution and the solution treated at conditions to reduce the resulting acid anion concentration thereof, as by neutralization, to achieve an aluminum/acid anion ratio of from about 1:1 to about 1.5:1 Thus, the reduced acid anion concentration promotes olation of the hydrolysis product and the formation of alumina polymers of colloidal dimension dispersed and suspended in the remaining liquid.

Reduction of the acid anion concentration can be effected in any conventional or otherwise convenient manner. For example, the acid anion concentration can be reduced utilizing aluminum metal as a neutralizing agent. In this case, the salt of neutralization is an aluminum salt subject to hydrolysis and ultimate sol formation. In some cases, as in the case of aluminum acetate, where the acid anion is sufficiently volatile, the desired acid anion deficiency may be created simply by heating. Another method of producing a suitable alumina hydrosol is in the electrolysis of an aluminum salt solution, for example an aqueous aluminum chloride solution, in an electrolytic cell having a porous partition between anode and cathode whereby an acid anion deficiency is effected in the cathode compartment with the formation of an alumina hydrosol therein.

Preferably, the acid anion-containing alumina hydrosol is an aluminum chloride hydrosol variously referred to as an aluminum oxychloride hydrosol, aluminum hydroxychloride hydrosol, and the like, such as is formed utilizing aluminum metal as a neutralizing agent in conjunction with an aqueous aluminum chloride solution. The aluminum chloride hydrosol is typically prepared by digesting aluminum in aqueous hydrochloric acid and/or aluminum chloride solution at about reflux temperature, usually from about 80° to about 105° C., and reducing the chloride anion concentration of the resulting aluminum chloride solution by the device of maintaining an excess of aluminum reactant in the reaction mixture as a neutralizing agent. In any case, the aluminum chloride hydrosol is prepared to contain aluminum in from about 1:1 to about 1.5:1 ratio with the chloride anion content thereof.

As heretofore stated, the tin component is incorporated in the catalyst composite by the device of solubilizing a tin compound in the acidic hydrosol precursor of the desired refractory inorganic oxide carrier material. Thus, regardless of the method of sol preparation, a tin compound is solubilized therein prior to gelation. Suitable tin compounds include stannous chloride, stannous bromide, stannous fluoride, stannic chloride, stannic fluoride, stannic iodide, stannic sulfate, stannic chloride trihydrate, stannic chloride tetrahydrate, stannic chloride pentahydrate, stannic chloride diamine, stannic chromate, stannic tartrate, and the like. Utilization of a tin halide, particularly stannous or stannic chloride, is preferable as it facilitates the incorporation not only of tin, but also at least a minor amount of halogen which has been recognized as a desirable component of the reforming type catalysts. In some instances, as in the case of stannous chloride, it is desirable to add the tin compound to the sol in solution with a halogen acid to obviate hydrolysis and premature precipitation of the tin component resulting in a non-uniform dispersion thereof in the final catalyst product.

Gelation of the sol, containing the tin component dispersed therein, can be effected in any conventional or otherwise convenient manner. Preferably, gelation is effected under controlled conditions to yield a carrier material having a surface area of from about 25 to about 500 square meters per gram. The carrier material preferably has an average bulk density of from about 0.30 to about 0.70 grams per cubic centimeter, and surface area characteristics such that the average pore diameter is from about 20 to about 300 Angstroms; the average pore volume is from about 0.10 to about 1.0 cubic centimeters per gram; and the total surface area is from about 100 to about 500 square meters per gram. In general, the best results are obtained with a spherical carrier material about 1/16 inch in diameter and comprising gamma-alumina, and having an average bulk density of from about 0.5 grams per cubic centimeter, a pore volume of from about 0.4 cubic centimeters per gram, and a surface area of from about 175 square meters per gram.

A preferred method for effecting gelation which affords a convenient means of developing the desired physical characteristics of the carrier material relates to the well-known oil drop method substantially as described by J. Hoekstra in U.S. Pat. No. 2,620,314. Accordingly, the tin-containing sol is admixed with a gelling agent at below gelation temperature, and the resulting mixture is dispersed as droplets in a hot oil bath whereby gelation occurs with the formation of firm spherical gel particles. The spherical gel particles are thereafter subjected to one or more aging treatments whereby desirable physical characteristics are imparted thereto. The gelling agent is suitably a weakly basic material substantially stable at normal temperatures but hydrolyzable to ammonia with increasing temperature. Hexamethylenetetramine is described as a most suitable gelling agent. Thus, the sol-hexamethylenetetramine mixture, still below gelation temperature, is dispersed as droplets into the oil suspending medium which is maintained at an elevated temperature effecting hydrolysis of the hexamethylenetetramine and gelation of the tin-containing sol into firm spherical gel particles. The hexamethylenetetramine is suitably utilized in an amount to effect substantially complete neutralization of the acid anion, e.g. chloride anion, content of the sol. Only a fraction of the hexamethylenetetramine is hydrolyzed or decomposed in the relatively short period during which initial gelation occurs. During the subsequent aging process the hexamethylenetetramine retained in the spheres continues to hydrolyze to ammonia, carbon dioxide and amines, effecting further polymerization whereby the pore characteristics of the carrier material are established. Generally, the gelled particles are aged in the oil bath for a period of from about 10 to about 24 hours at a temperature of from about 50° to about 105° C., and thereafter washed, dried and calcined.

As previously mentioned, the foregoing method affords a convenient means of developing desired physical characteristics in the carrier material. The method includes a number of process variables which effect the spherical gel product. Generally, the metals/acid anion ratio of the sol will influence the average bulk density of the gel product, and correspondingly, the pore diameter and pore volume characteristics attendant therewith — lower ratios tending toward higher average bulk densities. Other process variables effecting physical properties include the time, temperature and pH at which the gelled product is aged. Usually, temperatures in the lower range and shorter aging periods tend toward higher average bulk densities. Surface area is normally a function of calcination temperature, a temperature of from about 425° to about 815° C. being suitably employed.

Although the present invention is directed to the manufacture of catalysts containing a platinum group metal, i.e., platinum, palladium, rhodium, ruthenium, osmium and iridium, platinum is a preferred catalyst component. The platinum group metal component is incorporated in the catalyst composite utilizing impregnating techniques known to the art. For example, the tin-containing alumina carrier material is suspended, dipped, soaked or otherwise immersed in an aqueous solution of a soluble platinum group metal compound. Suitable compounds include platinum chloride, chloroplatinic acid, ammonium chloroplatinate, dinitrodiaminoplatinum, palladium chloride, chloropalladic acid, and the like. Utilization of a platinum group metal compound with halogen, such as chloroplatinic acid, is preferred as it facilitates incorporation of the platinum group metal component as well as a halogen component. Hydrogen chloride is also generally added to the impregnating solution to further facilitate incorporation of both the platinum group metal and a halogen component in the catalyst composite. The tin-containing carrier material is preferably maintained in contact with the impregnating solution at ambient temperature conditions for a brief period, preferably for at least about 30 minutes, and the impregnating solution thereafter evaporated substantially to dryness. For example, a volume of tin-containing alumina particles is immersed in a substantially equal volume of impregnating solution in a steam jacketed rotary dryer and tumbled therein for a brief period at about room temperature. Steam is thereafter applied to the dryer jacket to expedite evaporation of the impregnating solution and recovery of substantially dry impregnated material. Following impregnation, the resulting impregnated material is subjected to a high temperature calcination or oxidation technique hereinafter described.

With regard to the amount of the tin component contained in the catalyst, it is preferably from about 0.01 to about 5.0 wt. % tin, calculated on an elemental basis, although it is within the scope of the present invention to prepare catalysts containing up to about 30 wt. % tin. Regardless of the absolute amounts of the tin and platinum group metal components utilized, the atomic ratio of the platinum group metal to the tin metal contained in the catalyst is preferably from about 0.1:1 to about 3:1 with best results achieved at an atomic ratio of from about 0.5:1 to about 1.5:1. This is particularly true when the total content of the tin component plus the platinum group metal component in the catalytic composite is in the range of from about 0.15 to about 2.0 wt. % thereof, calculated on an elemental tin and platinum group metal basis.

The resulting composite generally will be dried at a temperature of from about 95° to about 315° C. over a period of from about 2 to about 24 hours or more and finally calcined at a temperature of from about 375° to about 595° C. in an oxygen-containing atmosphere, such as air, for a period of from about 0.5 to about 10 hours in order to convert the metallic components substantially to the oxide form. The oxidized composite is thereafter heated in an inert atmosphere, such as nitrogen, at a temperature of from about 95° to about 600° C. to remove residual adsorbed oxygen.

The platinum group metal-impregnated, tin-containing alumina, substantially free of adsorbed oxygen, is further treated in contact with a polyalkyl substituted aluminum compound, preferably a di- or trialkyl aluminum compound containing straight chain alkyl groups of from about 1 to about 6 carbon atoms. Suitable polyalkyl aluminum compounds thus include trimethyl aluminum, triethyl aluminum, tri-n-propyl aluminum, tri-n-butyl aluminum, tri-n-pentyl aluminum, tri-n-hexyl aluminum, and the like. Suitable polyalkyl aluminum compounds further include polyalkyl aluminum halides, for example, dimethyl aluminum chloride, diethyl aluminum chloride, trimethyl aluminum chloride, triethyl aluminum chloride, etc., as well as polyalkyl aluminum hydrides, for example diethyl aluminum hydride, diisobutyl aluminum hydride, ethylaluminum dihydride, etc. Tetraalkyl aluminate, such as sodium tetraethylaluminate, potassium tetramethylaluminate, etc., may also be used in this application. It is a preferred practice to employ a hydrocarbon diluent, typically n-pentane, n-hexane, benzene, toluene, cyclopentane, cyclohexane, xylene, or a hydrocarbon blend commonly known as mineral spirts. Polyalkyl aluminum concentrations of from about 5 to about 50% in the hydrocarbon diluent are satisfactory, for example, a 20% concentration of triethyl aluminum in n-hexane is a preferred solution for treating a platinum-impregnated, tin-containing alumina. The polyalkyl aluminum treatment involves an exothermic reaction and, in some cases, it may be desirable to immerse the material to be treated in a solution of relatively low concentration while increasing the concentration at a rate determined by the heat of reaction. In any case, a final concentration of the solution should be such as to provide at least a slight excess of polyalkyl aluminum compound. While the polyalkyl aluminum treatment may be effected under liquid or vapor phase conditions, it is preferred to maintain a substantially liquid phase operation at a temperature in the range of from about 35° to about 95° C.

The resultant composite is subjected to a substantially water-free reduction step prior to its use in the conversion of hydrocarbons. This step is designed to insure a uniform and finely divided dispersion of the metallic components throughout the carrier material.

Preferably, substantially pure and dry hydrogen (i.e., less than 20 volume ppm H$_2$O) is used as the reducing agent in this step. The reducing agent is contacted with the calcined catalyst at a temperature of from about 425° to about 650° C. and for a period of from about 0.5 to about 10 hours or more effective to substantially reduce the platinum component to its elemental state. This reduction treatment may be performed in situ as part of a start-up sequence if precautions are taken to predry the plant to a substantially water-free state and if substantially water-free hydrogen is used.

The reduced catalytic composite may, in some cases, be beneficially subjected to a presulfiding operation designed to incorporate in the catalytic composite from about 0.05 to about 0.5 wt % sulfur, calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas, such as a mixture of hydrogen and hydrogen sulfide having about 10 moles of hydrogen per mole of hydrogen sulfide, at conditions sufficient to effect the desired incorporation of sulfur, said conditions generally including a temperature ranging from about 10° to about 595° C. or more. It is good practice to perform this presulfiding step under substantially water-free conditions.

Reforming of gasoline feed stocks in contact with the catalyst of this invention as herein contemplated, is suitably effected at a pressure of from about 50 to about 1000 psig and at a temperature of from about 425° to about 595° C. The catalyst of this invention permits a stable operation to be carried out in a preferred pressure range of from about 50 to about 350 psig. In fact, the stability exhibited by the catalyst of this invention is equivalent to or greater than as heretofore been observed with respect to prior art reforming catalyst at relatively low pressure reforming conditions. Similarly, the temperature required is generally lower than required for a similar reforming operation utilizing prior art reforming catalysts. Preferably, the temperature employed is in the range of from about 480° to about 565° C. It is well known in the art that the initial temperature selection is made primarily as a function of the desired octane rating of the product, and the temperature is subsequently adjusted upwardly during the reforming operation to compensate for the inevitable catalyst deactivation that occurs to provide a constant product. It is a feature of the present invention that the required rate of temperature increase to maintain a constant octane product is substantially lower than is required with prior art catalyst including prior art tin-platinum catalyst.

Although the catalyst composition of this invention is most suitable for reforming, it may be used to promote other reactions including dehydrogenation of specific hydrocarbons or hydrocarbon fractions, isomerization of specific hydrocarbons or hydrocarbon fractions, destructive hydrogenation or hydrocracking of larger hydrocarbon molecules such as those occurring in the kerosine and gas oil boiling range, and the oxidation of hydrocarbons to produce first, second and third stage oxidation products. Reaction conditions employed in the various hydrocarbon conversion reactions are those heretofore practiced in the art. For example, alkyl aromatic isomerization reaction conditions include a temperature of from about 0° to about 535° C., a pressure of from about atmospheric to about 1500 psig, a hydrogen to hydrocarbon mole ratio of from about 0.05:1 to about 20:1 and a liquid hourly space velocity of from about 0.5 to about 20. Likewise, typical hydrocracking reaction conditions include a pressure of from about 500 to about 3000 psig, a temperature of from about 200° to about 500° C., a liquid hourly space velocity of from about 0.1 to about 10, and a hydrogen circulation rate of from about 1000 to about 10,000 standard cubic feet per barrel.

The following example is presented in illustration of the method of this invention and is not intended as an undue limitation on the generally broad scope of the invention as set out in the appended claims.

EXAMPLE

An alumina hydrosol with an aluminum/chloride ratio of about 1.15:1 and containing 13.7 wt. % aluminum is prepared by digesting substantially pure aluminum pellets in hydrochloric acid utilizing an excess of the aluminum reactant as the neutralizing agent. Thereafter, an amount of stannic chloride calculated to provide a final catalyst product containing 0.5 wt. % tin is dissolved in the acidic hydrosol. A 28% aqueous hexamethylenetetramine solution is then admixed with the tin-containing sol in an amount to effect, upon total decomposition, about 125% neutralization of the sol chloride. The mixture is subsequently dispersed as droplets in a hot (90° C.) oil bath to form tin-containing alumina spheres. The spheres are aged overnight in the hot oil bath, and then in an aqueous ammoniacal solution for about 3 hours. The spheres are then oven-dried at 200° C., and calcined in air at 650° C. for about 2 hours. Tin-containing alumina spheres with an average diameter of about 1/16 inch and an average bulk density of about 0.56 grams per cubic centimeter, are recovered.

About 550 cubic centimeters of the calcined spheres are immersed in 375 cubic centimeters of an aqueous solution containing 165 cubic centimeters of aqueous chloroplatinic acid (10 milligrams of platinum per cubic centimeter) and 13.2 cubic centimeters of concentrated hydrochloric acid. The solution is then evaporated to dryness utilizing a rotary steam evaporator. The dried spheres are then calcined in flowing air for about 3 hours at 525° C., during the first 2 hours of which the catalyst is exposed to an HCl/H$_2$O mixture, and heated in a stream of dry nitrogen at about 520° C. for 1 hour. After cooling, the spheres are immersed in an excess volume of a 10% heptane solution of triethyl aluminum, and maintained therein for about 16 hours, during which time the temperature peaks at about 50° C. The hydrocarbon solution is then decanted from the spheres and, after about a 3 hour nitrogen purge at 25° C., the spheres are reduced by passing a stream of substantially pure hydrogen containing less than 20 ppm H$_2$O over the spheres at a gaseous hourly space velocity of about 250 and at a temperature of about 530° C. for a 2 hour period. The final catalyst composition, containing 0.05 wt. % tin, 0.60 wt. % platinum, and 0.85 wt. % chloride supported on gamma-alumina, has an average bulk density of about 0.63 grams per cubic centimeter.

The catalyst thus prepared was evaluated in a laboratory scale reforming plant comprising a reactor containing the catalyst, a hydrogen separator and a debutanizer column. In this plant, the hydrogen-rich recycle stream and the hydrocarbon charge stock were commingled and preheated to a desired temperature. The hydrogen charge stock was a heavy Kuwait naphtha characterized by an API gravity at 15.5° C. of 60.4, an F-1 clear octane rating of 40.0, and a 85°–182° C. boiling range. The hydrogen-hydrocarbon mixture was passed downflow through the reactor containing the catalyst disposed in a fixed bed. The reactor effluent stream was passed through a high pressure-low temperature separator wherein a hydrogen-rich gaseous phase was separated from the liquid phase at a temperature of about 13° C. A portion of the gaseous phase was continuously passed through a high surface area sodium scrubber and the resulting substantially water-free hydrogen stream recycled to the reactor, and the excess over that required for plant pressure was recovered as excess separator gas. The liquid phase was withdrawn from the separator and passed through the debutanizer column where light ends were taken overhead as debutanizer gas, and a $C_5+$ reformate stream recovered as bottoms.

The catalyst composition was in each case evaluated for low pressure reforming over six test periods, each test period comprising a 12 hour line-out period followed by a 12 hour test period at constant temperature during which time the $C_5+$ reformate product was collected. Reforming conditions include adjusting the reactor inlet temperature to maintain 100 R.O.N. clear $C_5+$ product. Reforming conditions further included a liquid hourly space velocity of about 3.0, a reactor outlet pressure of 300 psig, and a hydrogen/hydrocarbon mole ratio of about 5:1. The tests results are tabulated below for each period in terms of reactor temperature to achieve 100 R.O.N, $C_5+$ LV% yield, net excess separator gas, and debutanizer overhead gas.

| Period No. | T, °C. | $C_5+$, vol.% | Separator Gas, SCF/BBL | Debutanizer Gas, SCF/BBL |
|---|---|---|---|---|
| 1 | 532 | 67.9 | 1148 | 316 |
| 2 | 536 | 68.2 | 1200 | 303 |
| 3 | 539 | — | 1187 | 304 |
| 4 | 539 | 72.0 | 1229 | 271 |
| 5 | 541 | — | 1247 | 257 |
| 6 | 541 | 74.6 | 1197 | 241 |

I claim as my invention:

1. A method of catalyst manufacture which comprises:
   a. solubilizing a tin salt in an aluminum hydroxyhalide hydrosol;
   b. effecting gelation of the tin-containing hydrosol;
   c. drying and calcining the tin-containing gelation product;
   d. impregnating the calcined product with an aqueous solution of a thermally decomposable platinum group metal compound;
   e. drying and calcining the impregnated material in an oxygen-containing atmosphere, and heating the same at conditions to remove adsorbed oxygen;
   f. commingling the resulting composite with a solution of a trialkyl aluminum compound; and
   g. drying and treating the dried composite in a hydrogen atmosphere at a temperature of from about 425° to about 650° C.

2. The method of claim 1 further characterized with respect to step (a) in that said hydrosol comprises aluminum in from about a 1:1 to about a 1.5:1 atom ratio with the halide anion content thereof.

3. The method of claim 1 further characterized with respect to step (a) in that said hydrosol is an aluminum hydroxychloride hydrosol comprising aluminum in from about a 1:1 to about a 1.5:1 atom ratio with the chloride anion content thereof.

4. The method of claim 1 further characterized with respect to step (a) in that said tin salt is stannic chloride.

5. The method of claim 1 further characterized with respect to step (a) in that said tin salt is utilized in an amount to provide a final catalyst product containing from about 0.01 to about 5.0 wt % tin.

6. The method of claim 1 further characterized with respect to step (b) in that said gelation is effected by commingling a weak base with said hydrosol and dispersing the mixture as droplets in a hot oil bath whereby gelation occurs with the formation of spheroidal gel particles, said weak base being substantially stable at normal temperatures and decomposable to ammonia with increasing temperature.

7. The method of claim 1 further characterized with respect to step (b) in that said gelation is effected by commingling hexamethylenetetramine with said hydrosol and dispersing the mixture as droplets in a hot oil bath whereby gelation occurs with the formation of spheroidal gel particles.

8. The method of claim 1 further characterized with respect to step (c) in that said tin-containing gelation product is calcined in air at a temperature of from about 425° to about 815° C.

9. The method of claim 1 further characterized with respect to step (d) in that said calcined product is impregnated with an aqueous solution of a thermally decomposable compound of platinum.

10. The method of claim 1 further characterized with respect to step (d) in that said calcined product is impregnated with an aqueous chloroplatinic acid solution in an amount to provide a final catalyst product containing from about 0.1 to about 2.0 wt % platinum.

11. The method of claim 1 further characterized with respect to step (e) in that said impregnated material is dried and calcined in air at a temperature of from about 375° to about 595° C., and thereafter heated at a temperature of from about 95° to about 600° C. in a dry nitrogen atmosphere.

12. The method of claim 1 further characterized with respect to step (f) in that said composite is commingled with a hydrocarbon solution of a trialkyl aluminum wherein the alkyl groups contain 1 to 6 carbon atoms.

13. The method of claim 1 further characterized with respect to step (f) in that said composite is commingled with a heptane solution of triethyl aluminum.

* * * * *